United States Patent Office

3,248,381
Patented Apr. 26, 1966

3,248,381
PROCESS FOR THE PREPARATION OF WATER-SOLUBLE AND WATER-INSOLUBLE SUCROSE ESTERS AND PRODUCTS OBTAINED THEREBY
Luciano Nobile and Tullio La Noce, Milan, Italy, assignors to Ledoga S.p.A., Milan, Italy, a corporation of Italy
No Drawing. Filed Oct. 18, 1962, Ser. No. 231,555
Claims priority, application Italy, Nov. 21, 1961, 20,961/61
8 Claims. (Cl. 260—234)

This invention relates to a transesterification process by means of which reaction products of sugar and a natural triglyceride with low and high combined sucrose content can be obtained in a single continuous operation.

Sugar esters obtained by transesterification of sugar with a natural triglyceride and having a low combined sucrose content, hereinafter called sugar glycerides, and containing, for instance, from 10% to 30% combined sucrose, are products which, depending on the acid radical of the natural triglyceride used and the combined sucrose content, appear as oils or in the form of thick waxy masses. With a higher combined sucrose content and with a greater predominance of fatty acid radicals of higher carbon content, the products will be in a physical state most closely resembling the thick, pasty and sometimes hard condition. The products are generally insoluble in water. The sugar esters obtained by transesterification with a natural triglyceride and having a still higher combined sucrose content, hereinafter referred to as water-soluble (or water-dispersible) sugar esters of fatty acids ("sucresters"), are solid products, generally friable and easily reduced to powder.

As stated in the copending application of Vitangelo D'Amato, Serial No. 799,100, filed March 13, 1959, now Patent No. 3,054,789, dated September 18, 1962 entitled, "Process for the Preparation of Pure Sucrose Esters," and in the application of Luciano Nobile and Tullio La Noce, entitled, "Process for the Preparation of Purified Sucrose Esters and Products Obtained Thereby," Serial No. 231,576, filed October 18, 1962, and now abandoned, these products consist mainly of sucrose monoesters of the fatty acids of the triglyceride used. The products in question dissolve in water giving clear transparent solutions. In practice, both the products with a lower combined sucrose content, and those with a higher one, can be employed in the most varied industries—alimentary, textile, agriculture, perfumery, cosmetics, detergents, etc.—because of their opposite and at the same time complementary properties.

A natural triglyceride reacts with sugar in various molecular ratios; that is, if the triglyceride/sucrose molecular ratio is near to 1:1, the formation of the so-called sugar glycerides which are not soluble in water, is favored; whereas, if the molecular proportion is nearer to 1:6.5, the so-called (water-) soluble sugar esters of fatty acids are generally formed.

The natural triglycerides employed in the present invention are the non-drying fatty oils and fats generally used in transesterification reactions with sucrose, as described, for example, in the patent to Hass, No. 2,893,990, dated July 7, 1959, such as coconut oil, palm oil, lard, and tallow.

A problem connected with the preparation of sugar esters is represented by the unreacted sucrose which is present in large amounts in the reaction mixtures, even in those obtained from low molecular ratios of the sucrose to the glyceride as, for instance, in the case of the preparation of sugar glycerides. The recovery of the sucrose, although it can be carried out quantitatively by applying the procedure described in the above-mentioned application Serial No. 231,576, always involves a by no means inconsiderable expense, and thus has an unfavorable effect on the cost of he final product. Moreover, the amount of dimethylformamide required for the reaction is strictly linked to the amounts of sugar employed, and, as we have found, in order to obtain good yields and products of high quality, it is necessary to use approximately six parts of dimethylformamide (DMF) per part of sugar, and the former is an expensive commercial product. Thus, by using less sugar or by establishing suitable conditions ensuring a greater utilization of the sucrose so as to have as little sugar as possible at the end of the reaction, there is automatically reduced the amounts of DMF that must be used; in other words, cheaper products are obtained.

In the course of solving this problem, we found that the molecular ratio in which triglycerides and sucrose react completely, that is, in which they yield reaction masses substantially without any free sugar, is 1 mol of triglyceride to 0.5 mol of sucrose. With this proportion, the sugar glycerides form as oily fluid or pasty masses. These products possess surprising properties which find wide industrial applications, particularly as emulsifiers. We found further that to ensure the formation of water-soluble sugar esters, the most economical optimum approaches a triglyceride/sucrose molecular ratio of 1: at least 2 and preferably 1:4.4. In the latter case, the reaction mass includes a large amount of unreacted sucrose—approximately 60% of the initial sucrose.

In accordance with the invention, there is added at the end of the last-mentioned reaction, which constitutes the first stage of the process, enough triglyceride to produce a triglyceride/unreacted sucrose molecular ratio of 1:0.5, that is, at the optimum ratio at which the sucrose reacts completely, or almost so, with the triglyceride. The reaction is then continued for another interval of time.

In the practice of the process of the present invention, many advantages are obtained in a single continuous operation. First of all, there is the simultaneous formation of sugar glycerides and water-soluble sugar esters; the free sugar at the end of the process is almost nil, and therefore the problem of recovering the sucrose is eliminated. Furthermore, using the same amount of DMF, it is possible to produce two different products and finally, when the operation is completed, the amount of water-soluble sugar esters is higher than that obtainable from the first stage of the reaction, as is shown by the examples hereinafter. The separation of the two products, sugar glycerides and water-soluble sugar esters of fatty acids, is carried out in the manner described in my above-identified application.

In carrying out the process of this invention, the sugar glycerides of low combined sucrose content are obtained by causing 1 mol of triglyceride to react with 0.5 mol of sucrose in DMF as solvent and in the presence of a base, such as potassium carbonate, as catalyst. By performing the reaction at a temperature of approximately 95° C. and in an inert atmosphere, such as nitrogen, and evaporating the DMF under vacuum at the end, a clear, fluid and limpid oily yellow product is obtained, free or almost free from sucrose. The product may be used as such, except in the pharmaceutical or food industries, in which case the procedure described in the above-mentioned Patent No. 3,054,789 may be applied to eliminate the last traces of DMF.

Pursuant to the general object of the present invention, there are obtained both water-insoluble sugar glycerides of low combined sucrose content and water-soluble sugar esters from natural triglyceride in a single continuous operation. In particular, 1 mol of natural triglyceride is made to react with preferably 4.4 mols of sucrose in sufficient DMF, as solvent, so that one part of the sucrose is dissolved in 6.4 parts of DMF in the presence of potassium carbonate as catalyst. This process favors the formation of the soluble sugar esters of the triglyceride used. At the end of the operation (from about 3 to 9 hours), and after analyzing for unreacted sucrose, a further amount of triglyceride is added, so as to bring the molecular ratio of the added triglyceride to the unreacted sucrose to 1:0.5. A further quantity of basic catalyst, generally potassium carbonate, may and preferably is also added. The reaction is continued for another interval of time ranging from about 3 to 9 hours, the length of this interval depending on the type of glyceride used. At the end of the reaction, the DMF is evaporated under vacuum. The reaction mass, consisting of a dense, limpid oil, is taken up in ethyl acetate and separated into its components—sugar glycerides of low combined sucrose content and water-soluble sugar esters of the acid of the triglyceride used—by the procedure of my above-identified application. The sugar glycerides and the water-soluble sugar esters of the acids of the natural triglyceride can be purified with respect to the DMF content by the process of the above-mentioned Patent No. 3,054,789.

The present invention also provides a procedure which ensures high yields of water-soluble sugar esters. It has already been stated that on reacting the triglyceride with the sucrose in a molecular ratio of 1 to at least 2 and preferably 1:4.4 (a ratio insuring the formation of water-soluble esters), only 40% of the initial sucrose reacts, the rest remaining unaltered. According to a further development of my invention, sufficient triglyceride is added to the mass so that the original molecular proportion of triglyceride to sucrose—that is, 1: at least 2 and preferably 1:4.4—is restored between the unreacted sucrose and the second addition of triglyceride. The reaction is continued for a further interval which may be approximately equal to the first. At the end of this second stage, approximately 65% of the initial sucrose has reacted, while roughly 35% remains unaltered. In order to bring the amount of unreacted sucrose to values where its recovery is of no practical importance, further triglyceride is added to the reaction mass, in such amount that the molecular ratio of triglyceride to free sucrose remaining from the second stage is again 1 to at least 2 and preferably 1:4.4. The mass is then allowed to react for a further period of time. The last fractions of free sucrose are made to react for another interval ranging from about 3 to 9 hours, under the same conditions as before, by adding a quantity of natural triglyceride at least sufficient to react with the same. At the end of the reaction, the DMF is evaporated, the pasty mass is taken up in ethyl acetate, and separated into its components, namely, sugar glycerides of low combined sucrose content and soluble sugar esters of the acids of the triglyceride used, by means of the procedure described in my above-identified application.

Whether the reaction stage wherein triglyceride reacts with sucrose in a molar ratio of triglyceride to sucrose of 1 to at least 2 (and preferably above 1:4.4) occurs only once or two or more times in the final reaction stage, so much triglyceride is added that the molar ratio of triglyceride to residual sucrose is 1: less than 1, and preferably 1:0.5.

According to the process described in the copending application Serial No. 231,576, referred to hereinabove, a substantially quantitative isolation of a water-dispersible sucrose ester or esters of high molecular weight aliphatic acids (having from 6 to 30 carbon atoms) resulting from the interesterification of sucrose with the glycerol triesters of such acids is obtained by evaporating the reaction solvent (such as DMF or other suitable solvent, such as dimethylsulfoxide), dissolving the residue in a lower alkyl acetate, preferably ethyl acetate, or about 60–90° C., extracting the solution at substantially the same temperature, separating the aqueous phase which contains the unreacted sucrose, cooling the organic layer to from 0 to 30° C., and extracting such layer with water of about the same temperature to remove the sugar ester fraction from the remaining organic fraction of the reaction product.

The invention is further described in greater detail and by way of illustration in the following examples which are not intended to indicate the scope of the invention.

*Example 1*

342 gm. (1 mol.) of sucrose are dissolved in 2,220 gm. of dimethylformamide, using gentle heat. The solution, kept at a temperature of 95° C., is treated with 1,292 gm. (2 mols.) of coconut oil and 37 gm. of potassium carbonate as catalyst. The resulting mixture is stirred for 9 hours in an atmosphere of nitrogen, while maintaining it at 95° C. At the end of the reaction, the dimethylformamide is evaporated under vacuum. The resulting sugar glyceride is a yellow, oily, transparent liquid which contains 19% combined sucrose. The product is freed from dimethylformamide by the process described in the above-mentioned Patent No. 3,054,789.

*Example 2*

2,052 gm. (6 mols.) of sucrose are dissolved, with the aid of heat, in 13,000 gm. of dimethylformamide. The solution, heated to 95° C., is treated with 880 gm. (1.36 mols.) of coconut oil and 28 gm. of anhydrous potassium carbonate as catalyst. The mixture is allowed to react for 9 hours at 90–95° C., with constant stirring, in an inert atmosphere (nitrogen). 15,960 gm. of a clear fluid are obtained at the end of the reaction. The solution is then divided into 4 equal parts and processed according to Examples 3, 4, 5 and 6.

*Example 3*

3,990 gm. of the reaction mass of Example 2 are evaporated to dryness. The residue is taken up in ethyl acetate and separated into its components according to the procedure described in our above-named application Serial No. 231,576. In particular, 89 gm. of oily product, hereinafter called "hemiglyceride" are obtained, along with 296 gm. of free sucrose and 355 gm. of soluble sugar esters of coconut oil acids. The quantity of free sucrose can be determined, for example, by suspending the mass in butyl alcohol, extracting with a 10% NaCl water solution, treating the extracted sucrose with a mineral acid, and then determining the glucose content with Fehling solution.

*Example 4*

3,990 gm. of the reaction mass of Example 2 are allowed to react with 1,115 gm. (1.88 mols.) of coconut oil and 26.5 gm. of anhydrous potassium carbonate at 90–95° C. and in an atmosphere of nitrogen. After 9 hours' reaction, the DMF is evaporated under vacuum. A thick oily mass is obtained (1,880 gm.). This mass is dissolved in 3,762 ml. of ethyl acetate at 70° C. 500 ml. of water previously heated to 80° C. are added to the solution. The mixture is stirred for several minutes and allowed to stand. The mixture separates immediately. The lower aqueous layer containing small percentages of sucrose is rejected. 490 ml. of ethyl acetate and 188 ml. of water are added to the upper organic layer. The mixture is shaken, and cooled to the critical temperature of 10° C. The mass separates into two liquid phases, a lower aqueous layer totalling 1,240 ml. and an upper organic one measuring 5,809 ml. The upper organic layer (5,809 ml.) is evaporated to dryness and 1,316 gm. of sugar glycerides are obtained as a clear, limpid, yellow oily fluid. The lower aqueous layer (1,240 ml.) is taken up in 885 ml. of butanol and 180 ml. of 20% NaCl solution. After heating to 45–50° C. with constant stirring, the mixture on being left standing, forms two layers. The lower aqueous layer (318 ml.) is rejected.

The upper butanol layer is evaporated to dryness, and yields 470 gm. of soluble sugar esters of coconut oil.

Example 5

3,990 gm. of reaction mass of Example 2, containing among other things 296 gm. (0.86 mol.) of free sucrose, are treated with 126 gm. (0.195 mol.) of coconut oil and 4 gm. of potassium carbonate as catalyst. The mixture is allowed to react for 9 hours at a temperature of 90–95° C., with stirring, in an atmosphere of nitrogen. The DMF is evaporated under vacuum at the end of the reaction. The residue is taken up with ethyl acetate and separated into its components according to the procedure described in application Serial No. 231,576. In particular, 140 gm. of hemi-glycerides, 175 gm. of free sucrose and 555 gm. of soluble sugar esters of coconut oil are obtained.

Example 6

3,990 gm. of the reaction mass of Example 2 are treated with 126 gm. of coconut oil and 4 gm. of potassium carbonate. The mixture is allowed to react for 9 hours at 90–95° C., with stirring, in an atmosphere of nitrogen. At the end of this period, 75 gm. of coconut oil and 2 gm. of potassium carbonate are added to the reaction mixture. The reaction is then continued under the same conditions as before, for an additional 9 hours. Finally, 378 gm. of coconut oil and 11 gm. of potassium carbonate are added and the reaction continued for another 9 hours. At the end of this period, and after evaporating off the DMF, the reaction mass is taken up in ethyl acetate and separated into the basic components by the method described in application Serial No. 231,576. In particular, the following products are separated: 659 gm. of sugar glycerides and 677 gm. of soluble sugar esters of coconut oil acids.

We claim:

1. Process for the preparation of mixtures of sucrose esters of high molecular weight non-drying fatty acids which are easily separable into esters of low combined sucrose content and esters of high combined sucrose content, comprising reacting 1 mol. of a non-drying natural triglyceride with from 2 to about 4.4 mols. of sucrose in dimethylformamide in an inert atmosphere and in the presence of a basic catalyst, at a temperature of 90–95° C., continuing the reaction for about 3 to 9 hours, thereafter adding a quantity of a non-drying natural triglyceride to the reaction mass which is at least sufficient to combine with all the unreacted sucrose, heating the mass to 90–95° C. for about 3 to 9 hours in the presence of a basic catalyst, and evaporating off the dimethylformamide.

2. Process according to claim 1, wherein the initial molecular ratio of natural triglyceride to sucrose is approximately 1:4.4.

3. Process according to claim 1, wherein the molecular ratio between the natural triglyceride added during the second stage of the reaction and the unreacted sucrose from the first stage is 2 to 1.

4. Process for the preparation of mixtures of sucrose esters with high molecular weight fatty acids from which high yields of water-soluble sucrose esters can be isolated, comprising reacting 1 mol. of a non-drying natural triglyceride with from 2 to about 4.4 mols. of sucrose in dimethylformamide in an inert atmosphere and in the presence of a basic catalyst at a temperature of 90 to 95° C. for about 3 to 9 hours, thereafter adding a quantity of non-drying natural triglyceride to the reaction mass to produce a ratio of 1 mol. of triglyceride to at least 2 mols. of unreacted sucrose, heating the mass at 90 to 95° C. for about 3 to 9 hours in the presence of a basic catalyst, then adding sufficient non-drying natural triglyceride to combine with all the residual unreacted sucrose, heating the mixture to effect esterification of residual sucrose, and thereafter evaporating off the dimethylformamide.

5. Process according to claim 1, in which the molecular ratio of the natural triglyceride to residual sucrose in the second stage is 1: less than 1.

6. Process according to claim 4, in which the molecular ratio of the natural triglyceride to residual sucrose in the third stage is 1 to less than 1.

7. The reaction product of the process of claim 1.

8. The reaction product of the process of claim 4.

References Cited by the Examiner

UNITED STATES PATENTS 2,893,990   7/1959   Hass _____ 260—234

FOREIGN PATENTS 603,988   8/1960   Canada.

LEWIS GOTTS, *Primary Examiner.*

CHARLES B. PARKER, *Examiner.*

NORMA S. MILESTONE, JOHNNIE R. BROWN,
*Assistant Examiners.*